Oct. 24, 1944.     I. W. COX     2,361,089
PRESSURE MOLDED METALLIC COMPOSITION ARTICLE AND SUPPORT
THEREFOR AND METHOD OF MAKING THE SAME
Filed March 30, 1942     2 Sheets-Sheet 1
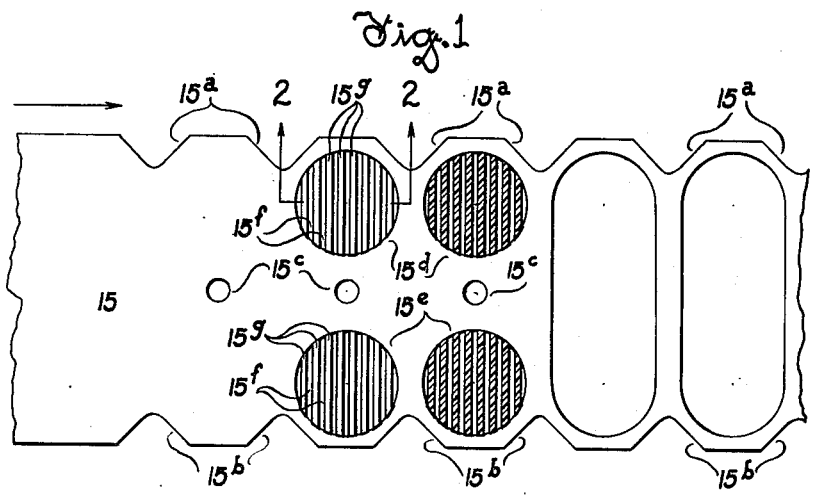
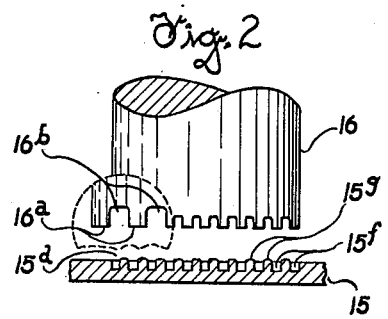
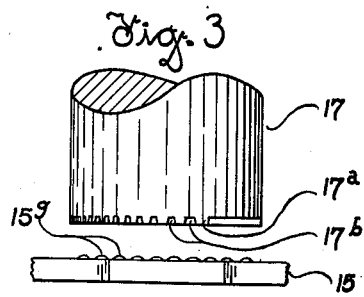
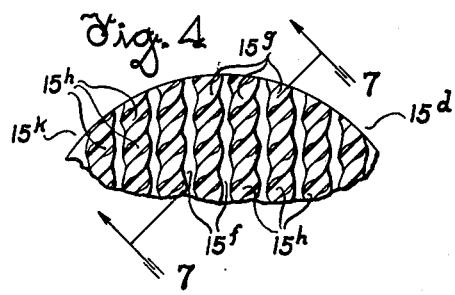
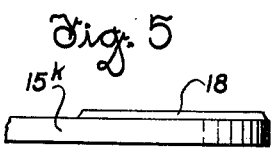
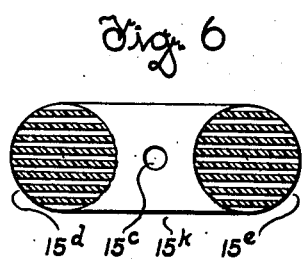
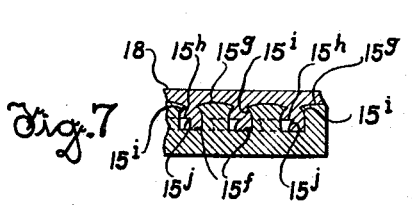
Inventor
Orvin W. Cox
By Frank H. Hubbard
Attorney Oct. 24, 1944.                I. W. COX                2,361,089
  PRESSURE MOLDED METALLIC COMPOSITION ARTICLE AND SUPPORT
      THEREFOR AND METHOD OF MAKING THE SAME
            Filed March 30, 1942        2 Sheets-Sheet 2
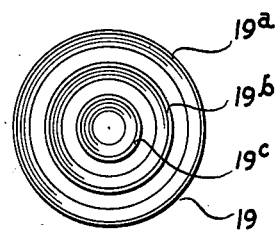
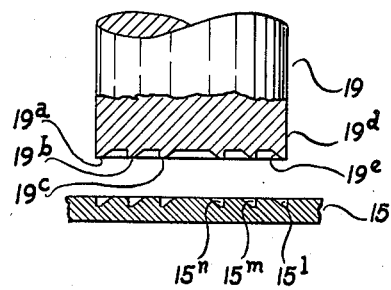
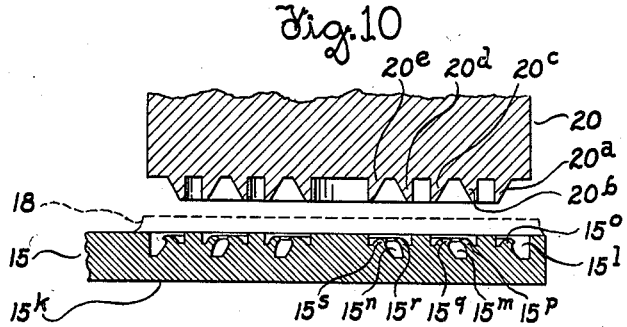
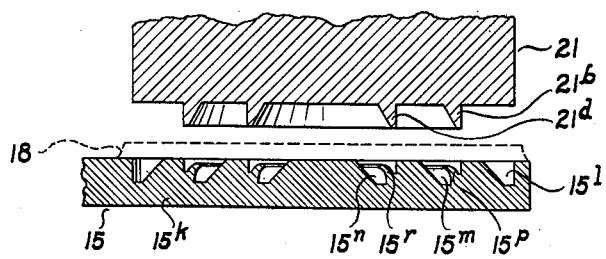
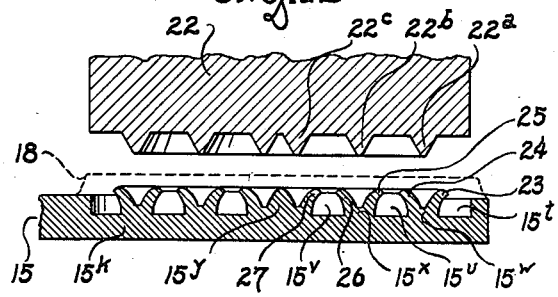
Inventor
Irvin W. Cox
By Frank H. Hubbard
Attorney Patented Oct. 24, 1944

2,361,089

UNITED STATES PATENT OFFICE 2,361,089

PRESSURE MOLDED METALLIC COMPOSITION ARTICLE AND SUPPORT THEREFOR AND METHOD OF MAKING THE SAME

Irvin W. Cox, West Allis, Wis., assignor to Cutler-Hammer, Inc., Milwaukee, Wis., a corporation of Delaware Application March 30, 1942, Serial No. 436,864

14 Claims. (Cl. 29—155.55)

This invention relates to improvements in pressure molded metallic composition articles and supports therefor and methods of making the same.

An object of the invention is to provide a permanent interlocking connection between a suitably prepared surface of a metal member and a powdered metallic composition layer to be molded under pressure in situ thereupon.

A more specific object of the invention is to provide a permanent, rigid, and more perfect mechanical and electrical connection between a molded metallic powder composition contact or contact tip and the support therefor.

Another object is to provide for simultaneous formation of a contact, composed of powdered material, upon and mechanical interlocking connection thereof with its conductive support by a simple molding operation.

Another object is to provide a contact support having a surface area thereof preformed by sequential operation of pressure dies thereupon, whereby recesses accessible from said surface of the support are partially overhung by integral portions of the material of which the support is composed.

Another object is to provide a combined contact tip and support of the aforementioned character wherein the amount of contact material required to provide the necessary or desired degree of mechanical interlocking connection is minimized.

Another object is to provide a combined contact tip and support of the character last mentioned wherein a relatively large degree of mechanical interlocking connection between the contact tip material and the support material is insured.

Another object is to provide for use of a novel material or composition in molding the contact tips upon their respective supports.

Another and more specific object is to provide means for insuring a good electrical connection between the mechanically interlocked or engaging portions of the support and the contact tip.

Another object is to provide novel methods of making articles of the aforementioned character.

Other objects and advantages of the invention will hereinafter appear.

The accompanying drawings illustrate certain embodiments of the invention which will now be described; it being understood that the embodiments illustrated are susceptible of modification in respect of the structural details thereof without departing from the scope of the appended claims.

In the drawings,

Figure 1 is a top plan view (normal size) of a strip or sheet of copper or other suitable metal which is fed or passed through a progressive die to provide for operation upon given surface areas thereof of each of a pair of different die members, whereby such surface areas have multiple portions thereof shaped to provide a mechanical interlocking connection between the same and a contact tip formed thereon from powdered material by a pressure molding operation, units of the strip so treated being sheared or punched therefrom to provide support members of the character illustrated in Fig. 6.

Fig. 2 is an enlarged fragmentary sectional view, on the line 2—2 of Fig. 1, a fragment of the die member used to form the initial group of alternate grooves and ridges (shown at the left-hand side of Fig. 1) being shown in withdrawn position, and a portion of said die being shown magnified to better illustrate the contour of the alternate grooves and ridges thereof.

Fig. 3 is a fragmentary side elevational view of the strip showing the support member in the condition thereof illustrated in Fig. 2—but with the second die member in position prior to engagement thereof with the strip, the relatively smaller width and depth of the alternate grooves and ridges of said second die member, and the angular relationship thereof to those of the first die member, being illustrated.

Fig. 4 is a fragmentary top plan view (about four times normal scale) of a support member after the second or final die forming operation (to be effected by the die member of Fig. 3), and after shearing or punching of the support member in its final form (see Fig. 6) from the metal strip.

Fig. 5 is a fragmentary side elevational view of a support member (like that shown in Fig. 6) with one of the contact tips molded thereon and united therewith by the mechanical interlocking connection therebetween.

Fig. 6 is a top plan view of a support member in its final form, but prior to molding the pair of contact tips thereonto.

Fig. 7 is a fragmentary sectional view, on the line 7—7 of Fig. 4, but with the contact tip molded thereonto, and illustrating the mechanical interlocking connection between the material of the contact tip and the support therefor.

Fig. 8 is a plan view of the operating face of a modified form of die member which may be utilized to initially form or deform a portion of the upper surface of a metal strip from which a contact tip supporting member is to be produced.

Fig. 9 is a fragmentary sectional view of a metal strip which has received the impression of the die member shown in Fig. 8, said die member being shown withdrawn, with a portion thereof in cross section, to illustrate the cross sectional contour of the concentric annular ridges formed thereon, the corresponding grooves formed thereby in the metal strip being illustrated.

Fig. 10 is a fragmentary sectional view of a contact tip supporting member punched from a strip like that shown in Fig. 9 after operation thereon of a second forming die member, a fragment of which is shown in section thereabove; the supporting member having the upper contour of the contact tip (to be molded thereonto) shown in dotted lines.

Fig. 11 is a sectional view similar to Fig. 10, but illustrating the manner in which overhanging integral interlocking portions of a contact tip support are produced by a simplified form of second die member, shown in section thereabove; the support member being here also shown sheared from the metal strip (Fig. 9), and the contact tip being illustrated by dotted lines; and Fig. 12 is a view similar to Figs. 10 and 11 illustrating the final form of integral interlocking portions formed adjacent to the upper surface of the contact tip supporting member by a second or final die forming member shown in section thereabove, the form of the initial die forming member (not shown) being slightly different from that illustrated in Figs. 8 and 9.

Referring first to that form of my invention illustrated in Figs. 1 to 7, the numeral 15 designates a strip of copper, or other suitable metal of good electrical conductivity, said strip being of substantial thickness, as shown in Figs. 2, 3, 5 and 7. In accordance with my invention strip 15 is passed through a progressive die, in the direction indicated by the arrow (Fig. 1). In said progressive die the first operation preferably consists in shearing from opposite edges of the strip 15 a pair of triangular portions, to provide the alined V-shaped notches designated by numerals 15ª and 15ᵇ, a substantially circular opening 15ᶜ being simultaneously punched in the strip at the mid-width thereof and offset to the right of the initial pair of notches 15ª and 15ᵇ, as shown at the left-hand end of the strip in Fig. 1. Two pairs of notches 15ª and 15ᵇ and the opening 15ᶜ located symmetrically with respect to said pairs are adapted for cooperative engagement by elements upon the die set (not shown) to insure proper positioning of a portion of the strip 15 for operation thereon of a pair of die members like that shown at 16 in Fig. 2.

The face of each die member 16 is of circular contour and consists of alternate relatively wide and relatively deep parallel ridges 16ª and grooves 16ᵇ, whereby the spaced circular areas 15ᵈ and 15ᵉ of strip 15 are provided with alternate relatively wide and relatively deep parallel grooves 15ᶠ and ridges 15ᵍ by the forming operation of the pair of dies 16 thereon—the widths of said ridges and grooves being preferably substantially equal to each other.

As shown in Fig. 1, the grooves 15ᶠ and ridges 15ᵍ of each area 15ᵈ and 15ᵉ are preferably arranged in planes at substantially right angles to the direction of the length of strip 15 (by properly positioning the pair of dies 16 in the die set).

In the next progressive operation of the die set the strip 15 will have been moved one notch toward the right (Fig. 1) to bring the spaced areas 15ᵈ and 15ᵉ last engaged by the pair of die members 16 into proper alinement with a second correspondingly spaced pair of die members of the character shown at 17 in Fig. 3. Each die member 17 has its lower face milled or machined to provide a multiplicity of alternate ridges and grooves 17ª and 17ᵇ, the width and depth of said grooves 17ᵇ being substantially less than the width and depth of the aforementioned grooves 16ᵇ on die members 16, whereas the width of ridges 17ª is preferably slightly greater than the width of grooves 17ᵇ and slightly less than the width of ridges 16ª aforementioned.

As indicated in Fig. 3 the parallel ridges and grooves on die members 17 are arranged at an angle (preferably about 45 degrees) with respect to the ridges and grooves formed on die members 16, so that upon forming operation of die members 17 with respect to the areas 15ᵈ and 15ᵉ of plate 15 the material of the multiple ridges 15ᵍ will be deformed or distorted in the manner best illustrated in Figs. 4 and 7; whereby multiple portions of each ridge 15ᵍ are adapted to overhang or overlap portions of the grooves 15ᶠ adjacent thereto, the interrupted grooves formed by die members 17 in the upper surfaces of the areas 15ᵈ and 15ᵉ being shown at 15ʰ in Fig. 4.

Also, as best illustrated in Fig. 7, as an incident to the formation of the interrupted grooves 15ʰ by the respective die members 17, not only are the upper surface portions of ridges 15ᵍ deformed to provide overhangs, as shown at 15ⁱ, but overhangs are also provided at a lower level, as indicated at 15ʲ. As a result, portions of the grooves 15ᶠ are constricted, or reduced in size, as viewed from the surface thereof; but as illustrated in Figs. 4 and 7 said grooves 15ᶠ are adapted to readily receive the powdered material of which the contact tips are formed.

The final form of the contact tip supporting members is indicated at 15ᵏ in Fig. 6 (and Fig. 4), it being understood that each member 15ᵏ is loosely or yieldably supported by an actuating element as by means of a headed pin or the like (not shown) the shank of which penetrates the opening 15ᶜ. Although in Fig. 6 I have shown a supporting member 15ᵏ for a pair of contact tips, it is to be understood that a member adapted to support a single contact tip may be provided. After the second die forming operation aforedescribed, the contact tip supporting members 15ᵏ are punched or sheared from strip 15 (see Figs. 1 and 6).

The contact tips 18 are applied to the supporting members 15ᵏ by a simple pressure molding operation. In practice the molding cavities, whose bottom walls are respectively defined by the upper ends of upwardly movable plungers, are provided with suitable charges of contact tip material in powdered form, whereupon the supporting member 15ᵏ is positioned face down (Fig. 6) thereover, and the plungers are moved upwardly to force the powdered material into the grooves 15ᶠ of the areas 15ᵈ and 15ᵉ and to compact the material, including the portions thereof forming the tips 18, under a relatively high molding pressure. Obviously, however, the supporting member may be positioned at the lower end of a cylinder to form the bottom wall of a cavity adapted to receive a suitable charge of the powdered material, with a plunger movable downwardly in the cylinder to compress or mold the material and form the outer surface of the contact tip.

The powdered contact material may be composed of silver or any other suitable substance. For example, the powdered material may be composed of a mixture of silver and cadmium sulphide, as disclosed in my Patent No. 2,288,122, granted June 30, 1942, for Metallic compositions for electrical contacts and the like, or a mixture of silver powder and cadmium oxide powder, as disclosed in my Patent No. 2,307,668, granted January 5, 1943, for Electrical contacts.

The form of silver powder which I prefer to employ is a commercial product known as Merck's precipitated silver which is characterized by a fibrous texture, extreme whiteness, and an unusual adaptability of its particles to felt together and cold weld under pressure to a tough solid of considerable tensile strength. Under certain conditions a quantity of crystalline silver powder (of 80 mesh and finer) may be substituted for a corresponding portion of Merck's precipitated silver powder, with advantageous results, as set forth in my aforementioned Patent No. 2,288,122. I have found in practice that by the use of up to 22 per cent by weight of such crystalline silver powder, a molded contact of superior performance is obtained. The resulting material in the finished articles has advantages in respect of mechanical resistance to wear, and in respect of added resistance to pitting and/or transfer of the contact material normally resulting from arcing.

Also, as disclosed in my aforementioned Patent No. 2,288,122, a quantity of cadmium sulphide may be included in the powdered mixture from which the contact tips are formed; the preferred proportions of the ingredients (by weight) being as follows:

| | Per cent |
|---|---|
| Merck's precipitated silver powder | 67 |
| Crystalline silver powder of 80 mesh and finer | 22 |
| Cadmium sulphide | 11 |

The preferred manner in which said ingredients are treated and mixed and the mixture treated preparatory to molding of the contact tips is described in detail in my Patent No. 2,288,122, to which reference may be had.

An alternative powdered composition from which the contact tips may be formed in the manner herein contemplated may, for example, consist of an intimate mixture of 10 per cent by weight of cadmium oxide and 90 per cent by weight of Merck's precipitated silver powder, such a composition being disclosed in my aforementioned Patent No. 2,307,668.

In using any of the aforementioned powdered materials for formation of contact tips, I prefer to place the required quantity of the material in a suitable mold at a temperature of about 400 degrees F., and then mold the material onto a supporting member or carrier, prepared in the manner herein disclosed (see Fig. 6), at a pressure of about 40,000 pounds per square inch. The contact tip when molded is adapted for use without sintering or other heat treatment.

As will be apparent from the above description, the essential feature of my invention is the idea of effecting at least two sequential forming operations (preferably in a progressive die) upon a given surface area of a metal member to provide a multiplicity of integral overhangs to permit entrance and compression thereunder of powdered contact tip forming material, such overhangs being proportioned to afford a maximum degree of mechanical interlocking connection between the material of the contact tip and the supporting member.

In practice I prefer to silver plate the contact tip supporting members $15^k$ (Fig. 6) to prevent oxidation of the surface areas thereof. Such plating likewise insures a good electrical connection between the material of the contact tips and the portions of the supporting member with which the material is mechanically interlocked by the aforedescribed molding operation.

In Figs. 8 and 9 I have illustrated at 19 a modified form of die for initially treating or forming the surface areas of the metal strip 15 (see Fig. 9) from which the contact tip supporting members are formed. The operating face of die 19 is formed to provide three concentric annular ridges $19^a$, $19^b$ and $19^c$; the ridge $19^a$ having a vertical wall $19^d$ coincident with the peripheral surface of die member 19 and an inwardly and upwardly angled wall $19^e$, with a relatively narrow horizontal surface or edge portion therebetween. The ridges $19^b$ and $19^c$ are of the same form as ridge $19^a$ in transverse cross section, as shown, and the same are preferably equally spaced one from another. As illustrated in section in Fig. 9, the die member 19 is adapted to form in strip 15 a circular area defined by an outer groove $15^l$ corresponding in cross sectional contour to that of the ridge $19^a$ of die member 19, and a pair of inwardly spaced concentric circular grooves $15^m$ and $15^n$ corresponding in cross sectional contour to the ridges $19^b$ and $19^c$ of member 19.

Thereafter the circular area in strip 15 defined by groove $15^l$ is subjected to the pressure-forming action of a second die member of the form shown in cross section at 20 in Fig. 10. Thus die member 20 has formed upon the lower surface thereof five concentric annular ridges or ribs $20^a$, $20^b$, $20^c$, $20^d$ and $20^e$, the ridges $20^a$, $20^c$ and $20^e$ having downwardly and inwardly angled outer side walls and inner vertical walls, with relatively narrow horizontal edges or surfaces between said outer and inner walls; whereas ridges $20^b$ and $20^d$ have vertical outer walls and downwardly and outwardly angled inner walls, with relatively narrow horizontal edges or surfaces between the outer and inner walls of the respective ridges. As will be apparent from Fig. 10, all of said ridges are preferably of the same dimensions in transverse cross section, but ridges $20^b$ and $20^d$ are reversely arranged with respect to the other ridges.

When the required degree of forming pressure is applied by die 20 to strip 15, the ridge $20^a$ acts to upset or distort the inner angular wall of the annular groove $15^l$ to provide an annular outward projection or overhang, designated by the numeral $15^o$. Similarly ridge $20^b$ acts to inwardly distort or upset the outer wall of groove $15^m$ to provide the inwardly projecting annular overhang $15^p$. Ridge $20^c$ acts to produce the annular outward projection or overhang $15^q$; ridge $20^d$ acts to produce the annular inward projection or overhang $15^r$; and ridge $20^e$ acts to produce the annular outward projection or overhang $15^s$.

As a result the annular grooves $15^l$, $15^m$ and $15^n$ are deformed to the shape thereof illustrated in cross section in Fig. 10; it being understood that the open upper ends of grooves $15^l$, $15^m$ and $15^n$, although constricted in the manner illustrated and described, are of sufficient width to provide for relatively free entrance of the powdered material of which the contact tip is formed, said powdered material when compacted by the relatively heavy molding pressure providing a good mechanical interlocking and electrical connection with the material of the supporting member 15$^k$ which is punched from strip 15. The contour of that portion of the contact tip above the upper surface of the supporting member 15$^k$ is shown at 18, in dotted lines in Fig. 10 and in full lines in Fig. 5.

In the form of my invention illustrated in Fig. 11, the grooves 15$^l$, 15$^m$ and 15$^n$ are initially formed by the die member 19 of Figs. 8 and 9, and thereafter the grooved areas are subjected to the forming action of a simplified form of die member shown in section at 21. Member 21 is provided on its lower surface with a pair of concentric annular ridges 21$^b$ and 21$^d$, which correspond in cross sectional shape and relative positions to the ridges 20$^b$ and 20$^d$ of Fig. 10. Upon forming operation of die member 21 against strip 15, the ridges 21$^b$ and 21$^d$ act to upset or deform the outer wall portions of the inner grooves 15$^m$ and 15$^n$, respectively; forming therefrom the inwardly extending annular portions or overhangs 15$^p$ and 15$^r$, like the correspondingly designated portions in Fig. 10. As will be noted, the annular groove 15$^l$ in Fig. 11 is unaffected by the forming operation of die member 21, but I have found in practice that the mechanical interlocking connection, provided by overhangs 15$^p$ and 15$^r$, between the contact tip supporting member and the contact tip, shown in dotted lines at 18, is sufficient for ordinary usage of the contact tips.

In the form of my invention illustrated in Fig. 12 a circular area of strip 15 is first acted upon by a die member (not shown) which is adapted to provide three concentric annular grooves 15$^t$, 15$^u$ and 15$^v$ of substantially rectangular form in transverse cross section. Said grooves are preferably equally spaced one from another by interposed ridges or ribs 15$^w$ and 15$^x$, with a centrally located circular portion 15$^y$. The ridges 15$^w$ and 15$^x$ and portion 15$^y$ project a substantial distance above the normal upper surface of strip 15.

The second forming operation is effected by means of a die 22 which is provided at its lower surface with three concentric annular ridges 22$^a$, 22$^b$ and 22$^c$, which are of substantially inverted triangular contour in transverse cross section. The ridges 22$^a$ and 22$^b$ are adapted to engage ridges 15$^w$ and 15$^x$ at the mid-widths of the latter, whereas the ridge 22$^c$ engages the central projection 15$^y$, as illustrated; whereby groove 15$^t$ is provided with an overhang 23; groove 15$^u$ is provided with opposed overhangs 24 and 25; and groove 15$^v$ is provided with opposed overhangs 26 and 27. After the contact tip supporting member 15$^k$ is punched from the strip 15 the powdered metal contact tip is molded thereonto, as indicated in dotted lines at 18.

In the forms of my invention illustrated in Figs. 8 to 12, inclusive, it is to be understood that the contact tip supporting member 15$^k$, after discharge thereof from the aforementioned progressive die, is preferably silver plated, for the purpose above set forth, and thereafter the contact tips are molded thereonto from powdered material in the manner aforedescribed, as indicated in dotted lines at 18 in Figs 10, 11 and 12.

Due to the fact that a portion of the molded material of the contact tip is inlaid within the body of the supporting member 15$^k$, the contact is adapted to function under normal conditions long after the main body portion has been worn away, without resulting in excessive heating or increase in contact resistance. The advantage of this arrangement is obvious.

As a result of my invention the molded contact tips are more perfectly connected, mechanically and electrically, to the supporting members than is possible by the welding or brazing technique employed heretofore. As a matter of fact, the welding or brazing operation is actually seriously detrimental to many molded composition contact tips, whereas such operations almost invariably adversely affect to some extent the perfection of the contact surfaces and the appearance of the final articles.

It is to be understood that the carrier 15$^k$ (Fig. 6), having the pair of contact tips 18 (Figs. 5 and 7) molded thereonto, is preferably adapted for cooperation with a pair of stationary contact tips (not shown) mechanically interlocked with and electrically connected to suitable stationary supports or terminal members in the same manner as aforedescribed.

While I have herein specifically disclosed my invention as applied to the improvement in and production of metallic powder composition contact tips molded under pressure in situ upon metal supports therefor prepared in the manner herein set forth; it is to be understood that my invention, in its broader aspect is similarly adapted for use in affording an anchorage, or mechanical interlocking connection, between the suitably prepared surface of a metal member of any form or shape and a powdered metallic composition layer of predetermined thickness to be molded under pressure in situ thereupon.

I claim:

1. As an article of manufacture, a sheet metal contact-supporting member for a metallic contact composition layer to be molded under pressure thereupon from powdered material, said member having a part only of one surface area thereof die-formed to provide a multiplicity of recesses with overhanging walls, said overhanging walls being adapted to provide a positive mechanical interlocking connection between said member and said powdered metallic contact composition layer.

2. As an article of manufacture, a flat sheet metal contact-supporting member of substantial thickness, said member having a plurality of recesses formed in a part only of one surface thereof, the walls of said recesses being deformed to provide integral overhangs, a metallic contact composition layer consisting of material in powdered form molded under heavy pressure in situ upon said member, and the powdered material of said layer being mechanically interlocked with said overhangs, for the purpose set forth.

3. As an article of manufacture, a metal contact-supporting member for a contact tip to be molded in situ thereon from powdered material, said member having a part only of one surface area thereof die-formed to provide a multiplicity of recesses with overhanging walls, said overhanging walls being adapted to provide a positive interlocking connection between said member and the powdered contact tip material.

4. As an article of manufacture, a metal contact-supporting member, said member having a part only of one surface area thereof die-formed to provide a multiplicity of recesses with overhanging walls, and a contact tip composed of powdered material molded under pressure in situ upon said member, the powdered material of said contact tip being mechanically interlocked with said overhanging walls.

5. As an article of manufacture, a flat metal contact-supporting member of substantial thickness, said member having a predetermined portion only of one surface thereof progressively deformed to provide a multiplicity of recesses with overhanging walls, a contact tip composed of powdered contact material molded under heavy pressure in situ upon said member, the powdered material of said contact tip being mechanically interlocked with said overhanging walls, and said contact tip being characterized by its adaptability for normal use without sintering.

6. As an article of manufacture, a flat sheet metal contact-supporting member of substantial thickness, said member having a plurality of grooves formed in a predetermined portion only of a surface area thereof, the walls of said grooves being deformed to provide integral overhangs, a contact tip the major constituent of which is precipitated silver powder of a fibrous texture, the powdered material of said contact tip being molded under heavy pressure in situ upon said member and being mechanically interlocked with said overhangs, and said contact tip being characterized by its adaptability for normal use without sintering.

7. As an article of manufacture, a flat sheet metal contact-supporting member of substantial thickness, said member having a plurality of grooves formed in a predetermined portion only of a surface area thereof, the walls of said grooves being deformed to provide integral overhangs, said member being silver-plated, for the purpose set forth, a contact tip the major constituent of which is precipitated silver powder of a fibrous texture, the powdered material of said contact tip being molded under heavy pressure in situ upon said member whereby the same is mechanically interlocked with said overhangs, and said contact tip being characterized by its adaptability for normal use without sintering.

8. An electrical contact comprising a metal supporting member a predetermined portion of a surface area of which is provided with grooves having overhanging wall portions, and a tip composed of powdered material pressure molded in situ upon and mechanically interlocked with said surface of the metal member, said powdered material consisting of at least 85 per cent by weight of precipitated silver powder of a fibrous texture, and said powdered material when molded being characterized by unusually long electrical life in the unsintered state.

9. An electrical contact comprising a metal supporting member a predetermined portion of a surface area of which is provided with a multiplicity of recesses having overhanging wall portions, a tip composed of powdered material cold molded under relatively high pressure in situ upon and mechanically interlocked with said surface of the metal member, and said powdered material consisting of an unalloyed mixture of about 90 per cent of precipitated silver powder of a fibrous texture and about 10 per cent of another ingredient, the material of said tip being characterized by its substantial freedom from sticking when in use and by a life which is much longer than that of a tip consisting of fine silver.

10. The method of producing a combined contact-support and a metallic contact composition layer adaptable for use without sintering, which comprises initially subjecting a portion only of a surface of a flat sheet metal contact support to the action of a pressure die member whereby a plurality of recesses are provided, thereafter subjecting said surface to the action of a different pressure die member to form additional recesses whereby portions of the walls of said first mentioned recesses are deformed to provide integral overhangs, and thereafter molding under heavy pressure in situ upon said surface a predetermined quantity of a metallic contact composition in powdered form to provide a layer, portions of said layer being mechanically interlocked with said overhangs as a result of the molding operation.

11. The method of preparing a metal member for attachment thereto of a contact tip composed of powdered material to be molded in situ thereon, which consists in first subjecting a portion only of a given surface area of said member to the action of a reciprocating pressure die member whereby a plurality of recesses are formed in said surface, thereafter subjecting said portion of said surface area to the action of a different reciprocating pressure die member to form therein another plurality of recesses whereby at least portions of the walls of said first mentioned recesses are deformed to provide integral overhangs, and thereafter silver-plating said member to insure a good electrical connection between the material of the contact tip and the walls of said recesses.

12. The method of producing a combined support and electrical contact tip adaptable for use without sintering, which comprises initially subjecting a portion only of a given surface area of a metal support to the action of a pressure die member whereby a plurality of parallel alternate grooves and ridges are provided, thereafter subjecting said portion of said surface area to the action of a different pressure die member to provide another plurality of parallel alternate grooves and ridges whereby at least portions of the walls of said first mentioned grooves are deformed to provide integral overhangs, and thereafter molding in situ upon said portion of said surface area a predetermined quantity of highly conducting material in powdered form to provide a contact tip, portions of said contact tip being mechanically interlocked with said overhangs as a result of the molding operation.

13. The method of producing a combined support and electrical contact tip adaptable for use without sintering, which comprises initially subjecting a predetermined portion of a given surface area of a metal support to the action of a reciprocating pressure die member whereby a plurality of parallel alternate grooves and ridges are provided, thereafter subjecting said portion of said surface area to the action of a different reciprocating pressure die member to provide another plurality of parallel alternate grooves and ridges respectively arranged at acute angles to those aforementioned whereby at least portions of the walls of said first mentioned grooves are deformed to provide integral overhangs, thereafter silver plating said metal support, for the purpose set forth, and thereafter molding in situ upon said member a predetermined quantity of highly conducting material in powdered form to provide a contact tip, portions of said contact tip being mechanically interlocked with said overhangs as a result of the molding operation.

14. The method of producing a combined support and electrical contact tip adaptable for use without sintering, which comprises initially subjecting a portion only of a given surface area of a metal support to the action of a pressure die member whereby a plurality of straight, parallel alternate grooves and ridges are provided, thereafter subjecting said portion of said surface area to the action of a different pressure die member to provide another plurality of straight, parallel alternate grooves and ridges respectively arranged at acute angles to those aforementioned whereby at least portions of the walls of said first mentioned grooves are deformed to provide integral overhangs, thereafter molding in situ upon said member a predetermined quantity of highly conducting material in powdered form to provide a contact tip, the major portion of said highly conducting material consisting of precipitated silver powder of a fibrous texture, said silver powder being characterized by an unusual adaptability of its particles to felt together and cold weld under pressure to a tough solid of relatively high tensile strength, and portions of said contact tip being mechanically interlocked with said overhangs as a result of the molding operation.

IRVIN W. COX.